United States Patent Office 3,113,260
Patented Dec. 3, 1963

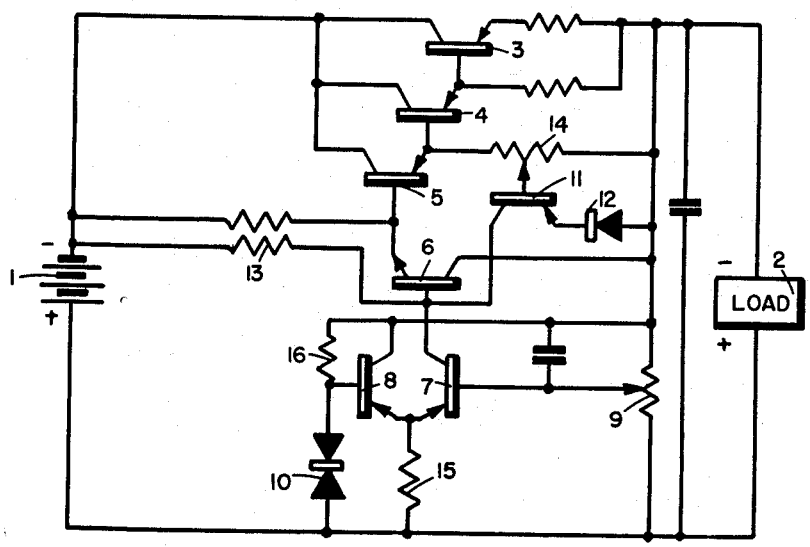
INVENTOR.
FRANK L. WILEY

3,113,260
CURRENT PROTECTION DEVICE
Frank L. Wiley, Long Beach, Calif., assignor to
North American Aviation, Inc.
Filed Aug. 21, 1957, Ser. No. 679,424
4 Claims. (Cl. 323—4)

This invention relates to current protection devices and more particularly to a current protection circuit of fast time response for protecting sensitive semi-conductor devices from overloads in current.

In electrical circuits of today, it is important to provide some form of current protection to protect the various electrical elements from oveload conditions caused by short circuits and the like. More specifically in circuits utilizing transistors, a sensitive quick-time response overload protection device is required. Transistors of the present art are designed for a range of current and voltage characteristics which are somewhat limited and a transistor will be seriously damaged by voltages and currents which exceed this range. Because of the inherent characteristics of a transistor, a current or voltage beyond the designed range of the transistor will seriously injure or destroy the transistor in a short time. Unlike most electrical devices, a transistor may be injured by an overload current in a relatively short time.

Current protection devices of the present art consist of overload fuses and air and oil circuit breakers which are inserted in circuit with the device to be protected so that when an overload condition is reached, the circuit through the protection device is opened. The present-day protection devices have provided adequate protection for elements such as a vacuum tube, capacitors, and resistors. However with the advent of the transistor and other semi-conductor devices, it has become necessary to develop a device which has a much faster time response than present protection devices. An overload current through a transistor will injure or destroy the transistor before any of the known protection devices of the types mentioned above can operate to open the circuit and correct the condition. Insertion of a present-day current protection device in circuit with a transistor does not adequately protect the transistor because an overload current may burn out the transistor before the protection device can operate.

The present invention contemplates a circuit for limiting the current through a transistor or other sensitive device to be protected with a time response which is faster than that of the allowable range of the transistor. The device of this invention provides a fast-acting normally open electronic switch which automatically closes to provide an alternative path in parallel with the circuit to be protected when an overload current condition occurs in the load circuit. Utilizing a quick time response, transistor circuit protection is provided by reducing the current through a device before any damage occurs. A simple and reliable circuit is provided which automatically protects the transistors in the circuit without affecting the efficiency or other operations.

It is therefore an object of this invention to provide an improved current protection device.

It is another object of this invention to provide a current protection device with fast time response.

It is still another object of this invention to provide a transistor current protection circuit with a fast time response.

It is a further object of this invention to provide a fast-acting electronic switch for opening a current supply circuit to a semi-conductor device when the current through the device reaches a predetermined dangerous level.

Other objects of the invention will become apparent from the following description taken in connection with the single FIGURE which is a schematic diagram of the circuit embodying this invention:

Referring to the figure, there is shown a circuit for supplying current from a source to a load. The circuit may be, for illustration purposes, a voltage regulated power supply device having a direct current source 1 for supplying current to a load 2. In series between source 1 and load 2 is a signal translating device which may be, for example p-n-p transistor 3 which is connected as a current regulating device having its emitter-collector circuit in series with load 2 and source 1. Connected to the base of transistor 3 to provide control therefor is a cascade arrangement of driver amplifier circuits comprising p-n-p transistors 4 and 5 which are connected to amplify a signal received at the base of transistor 5 and present the amplified signal to the base of transistor 3 to control the current through its collector emitter circuit. N-P-N transistor 6, having its emitter connected to the base of transistor 5 and its collector connected to one side of resistor 9 is in circuit with the driver transistors to receive a signal from its base which is in turn connected to the collector of differential amplifier 7 and presents a proportionate signal to transistor 5. P-N-P transistors 7 and 8 are connected to sense the voltage across resistor 9 which is connected across load 2. A wiper is connected to an intermediate point of resistor 9 and also to the base of transistor 7. The potential at the base of transistor 7 is proportional to the potential across load 2. A constant voltage reference is provided for transistor 8 by voltage reference 10 which may be, for example, a zener diode which is connected between the base of transistor 8 and the plus side of source 1. The circuitry described so far operates as a voltage regulated power supply circuit which senses voltage changes from the predetermined reference by the voltage across load 2 and compensates for these changes by controlling the flow of current through transistor 3 in response thereto. In the voltage regulator as shown, transistor 7 and transistor 8 operate as a differential amplifier in which the voltage at the base of transistor 7 is compared with the reference voltage established by diode 10 on the base of transistor 8 and the difference voltage controls the current in the collector of transistor 7. For example, a decrease in voltage across load 2 causes a proportional decrease in voltage at the base of transistor 7. The difference between the reference voltage and the voltage at the base of transistor 7 is reflected by a decrease in the current flowing from the collector of transistor 7 through resistor 13 to D.-C. source 1. The decrease in current through resistor 13 causes a decrease in current in the base of transistor 6. The emitter current of transistor 6 decreases proportionately and this effect is cascaded through transistors 5 and 4, increasing the current in the base of transistor 3. The increase of current in the base of transistor 3 causes a proportional increase in current in the emitter-collector circuit of transistor 3, which being connected in series with source 1 and load 2 causes the voltage across load 2 to increase, thus tending to raise the voltage to the value of the reference voltage.

In order to protect the transistors in the regulator circuit from being overloaded by an increase in current through load 2, caused, for example, by a short circuit connection, a circuit is provided which automatically maintains the current through load 2 below a predetermined maximum current level. The circuit comprises p-n-p transistor 11 which has its emitter connected through diode 12 to the minus side of load 2 and its collector connected in common with the base of transistor 6 through resistor 13 to the minus side of source 1. Control for transistor 11 is provided by a circuit having the base connected to an intermediate point of a current limiting adjustment resistor 14 which has one terminal connected to the minus side of load 2 and the other terminal connected to the emitter of transistor 5. The current flowing through resistor 14 is proportional to the current flowing through load 2. Transistor 11 is normally cut off with its emitter to base potential established so that conduction will not occur within the predetermined range of allowable current through load 2. This range may be established by varying the intermediate point on resistor 14. Diode 12 in conjunction with resistor 14 establishes the base to emitter potential. Transistor 11 will conduct when the current through resistor 14 reaches a predetermined amount which is proportional to the maximum allowable current through load 2. When the maximum allowable current through load 2 is reached, the current flowing through resistor 14 provides a voltage on the base of transistor 11 which is sufficient to cause conduction.

In operation, D.-C. source 1 is supplying a regulated voltage to load 2. Any change in voltage from the predetermined reference is compensated for by the heretofore described regulator circuit which maintains a constant voltage across load 2. Normal operation will continue until such time as the output current through load 2 reaches the maximum allowable level at which time the current protection circuit will operate. Assume, for example, a partial short circuit across load 2 which causes the current to increase rapidly thereby endangering the transistors in the voltage regulator circuit. The current through resistor 14 increases proportionally and a voltage at the base of transistor 11 is established which causes conduction in transistor 11, thereby closing a current path alternative to that through transistor 3 and including diode 12, the emitter-collector circuit of transistor 11, and resistor 13. The current through resistor 13 increases which results in an increase in the base current of transistor 6 which in turn operates through transistors 5 and 4 to reduce the current through transistor 3. As the current increases through load 2 and resistor 14, transistor 11 conducts more heavily approaching saturation, thus further reducing the current supplied to load 2 from transistor 3 which in turn causes the output voltage across load 2 to drop further. However during the time of operation of the current protection circuit, the voltage regulating circuit is attempting to function also. The decrease in the output voltage across load 2 caused by the current protection circuit is sensed by the differential amplifier 7 which operates to correct for this condition. As the voltage decreases, the current through the collector of transistor 7 decreases rapidly, attempting to provide a compensating signal to the base of transistor 6. However the current flowing from transistor 11 through the base of transistor 6 is large enough to keep the current from transistor 7 ineffective. As the voltage continues to decrease, transistor 7 is eventually cut off. The current protection circuit is now in complete control of the operation. The output voltage drops further, maintaining the current through load 2 below the maximum allowable. When the current and voltage at load 2 become stabilized, no further reduction in current supplied to load 2 is provided by the current protection circuit.

Operation of the current protection circuit when a complete short circuit is created is substantially as described above. A short circuit across load 2 results in an immediate increase in current which causes transistor 11 to become saturated. The base voltage of transistor 6 drops, causing a corresponding drop in base voltage at transistor 3. Transistor 11 assumes complete control of transistor 6. The voltage across load 2 decreases rapidly causing transistor 7 to be cut off. The voltage across load 2 drops toward zero until sufficient to maintain the maximum allowable current through the low impedance of load 2 established by the short circuit.

Operation of the current protection circuit including transistor 11 is such that the current through the transistors of the voltage regulated circuit is not allowed to go above the maximum allowable for enough time to damage the transistors. The inherent fast time response of transistor 11 to a change in voltage of its base relative to its emitter provides automatic and efficient protection for any overload current operation in the circuitry. The circuit described is particularly adapted to a low voltage-low current regulated power supply.

The embodiment of the invention described is a current protection device for use with a regulated power supply. It may be readily appreciated that many other applications for the current protection circuit may be utilized. For example, in any circuit which has a load which may be short-circuited or suffer hugh current overloads, the current protection device of the figure including transistor 11, diode 12, and resistor 13 may be connected in parallel with the load with the base of transistor 11 connected to a circuit for establishing a current proportional to that going through the load. In this manner, transistor 11 will operate as a normally open switch which will quickly close when the maximum allowable current passes through the load. It should also be apparent that although transistor 11 is shown at a p-n-p transistor, an n-p-n transistor could be used equally well with standard modifications to adjust for difference in polarity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a first transistor having a collector, an emitter, and a base, said collector and emitter connected to supply current to a load from a source through a series-connected resistor, a second transistor having a collector, an emitter, and a base, a two-terminal circuit means including a diode connected in series with the emitter-base junction of said second transistor for providing emitter-base current through said second transistor, said means having one terminal connected to a junction between said resistor and said load, and the other terminal connected to said resistor to receive a voltage proportional to the current through said load, and means for coupling the collector of said second transistor to the base of said first transistor to present thereto a current proportional to the potential difference across the emitter-base of said second transistor to cause a reduction in the flow of current through said first transistor when said load current exceeds a pre-determined maximum level.

2. In a circuit adapted to protect a signal translating transistor device against overload and having regulating means cooperating therewith for supplying current at constant potential to a load from a source; a normally open protection circuit connected in parallel with said translating device between said source and said load, said circuit comprising a transistor having an emitter, a collector and a base, and adapted to have current flow between said emitter and collector controlled by potential applied to said base, said emitter being biased in accordance with a voltage supplied by diode means; means for obtaining a potential drop proportional to current through said load and for applying said potential drop to said transistor base; means, controlled by said potential drop and effective at a pre-determined value of current in said load, connected to said transistor base for permitting a portion of the load current to flow through said emitter-collector electrodes; said load current portion being effective to maintain the base current of said signal translating transistor device at such a value as to maintain current through said load below a pre-determined maximum current level, independent of the resistance of said load, and for overriding said means for maintaining constant potential across said load.

3. Apparatus for supplying current from a current supply source to a load circuit including a load comprising a first and a second transistor each having an emitter, a collector and a base, a resistor, a first and a second current path for supplying current from said source to said resistor, said first and second current paths comprising the emitter-collector paths of said first and second transistors respectively, means for deriving from said load circuit and impressing upon the emitter-base paths of said first and second transistors a first and a second control voltage respectively, and means responsive to the current supplied to said resistor for controlling the current supplied to said load.

4. Apparatus for supplying current from a current supply source to a load comprising a first, a second, and a third transistor each having an emitter, a collector and a base, means for connecting the emitter-collector path of said first transistor in series with said supply source and said load, means for impressing upon the emitter-base path of said second transistor a voltage which varies in accordance with load voltage changes to control a first current supplied from said source through the emitter-collector path of said second transistor, means for impressing upon the emitter-base path of said third transistor a voltage which varies in accordance with load current changes to control a second current supplied from said source through the emitter-collector path of said third transistor, and means responsive to the sum of said first and second currents for controlling the resistance of the emitter-collector path of said first transistor.

References Cited in the file of this patent

UNITED STATES PATENTS

| | | |
|---|---|---|
| 2,693,568 | Chase | Nov. 2, 1954 |
| 2,697,811 | Deming | Dec. 21, 1954 |
| 2,767,330 | Marshall | Oct. 16, 1956 |
| 2,832,900 | Ford | Apr. 29, 1958 |
| 2,888,633 | Carter | May 26, 1959 |
| 2,904,742 | Chase | Sept. 15, 1959 |